United States Patent [19]

Wilber et al.

[11] Patent Number: 4,916,366

[45] Date of Patent: Apr. 10, 1990

[54] POWER SUPPLY PROTECTION CIRCUIT

[75] Inventors: James A. Wilber; Joseph C. Stephens, both of Indianapolis, Ind.

[73] Assignee: Thomson Consumer Electronics, Inc., Indianapolis, Ind.

[21] Appl. No.: 273,529

[22] Filed: Nov. 21, 1988

[51] Int. Cl.$^4$ .................. H01J 29/70; H01J 29/56; H04N 5/63

[52] U.S. Cl. .................. 315/411; 315/371; 358/190

[58] Field of Search .................. 315/370, 371, 411; 358/190, 243

[56] References Cited

U.S. PATENT DOCUMENTS 4,084,115 4/1978 Peer .................. 315/371
4,544,864 10/1985 Haferl .................. 315/393
4,672,642 6/1987 Willis et al. .................. 377/20

OTHER PUBLICATIONS

A Publication entitled RCA Engineer published Jun. 25, 1980, pp. 40 and 41.
Television Service Data for RCA Television Chasis CTC 101 published 1979, the cover page and schematic pp. 42-43.

Primary Examiner—Thomas H. Tarcza
Assistant Examiner—Gregory C. Issing
Attorney, Agent, or Firm—Joseph S. Tripoli; Joseph J. Laks; Sammy S. Henig

[57] ABSTRACT

A horizontal deflection circuit includes a flyback transformer. A secondary winding of the flyback transformer is coupled in series with a diode switch to produce a trace rectified supply voltage that energizes a vertical deflection amplifier. The diode switch also provides switching operation in an East-West diode modulator. During, for example, service mode operation, when the vertical raster is collapsed, the trace current in the secondary winding is substantially reduced. The reduced trace current is sensed for producing a control signal that causes the peak current supplied by the diode switch to the diode modulator to be smaller than the trace current in the secondary winding. This ensures that the diode switch remains conductive throughout horizontal trace, thereby, preventing an undesirable increase in the supply voltage from occurring.

28 Claims, 1 Drawing Sheet

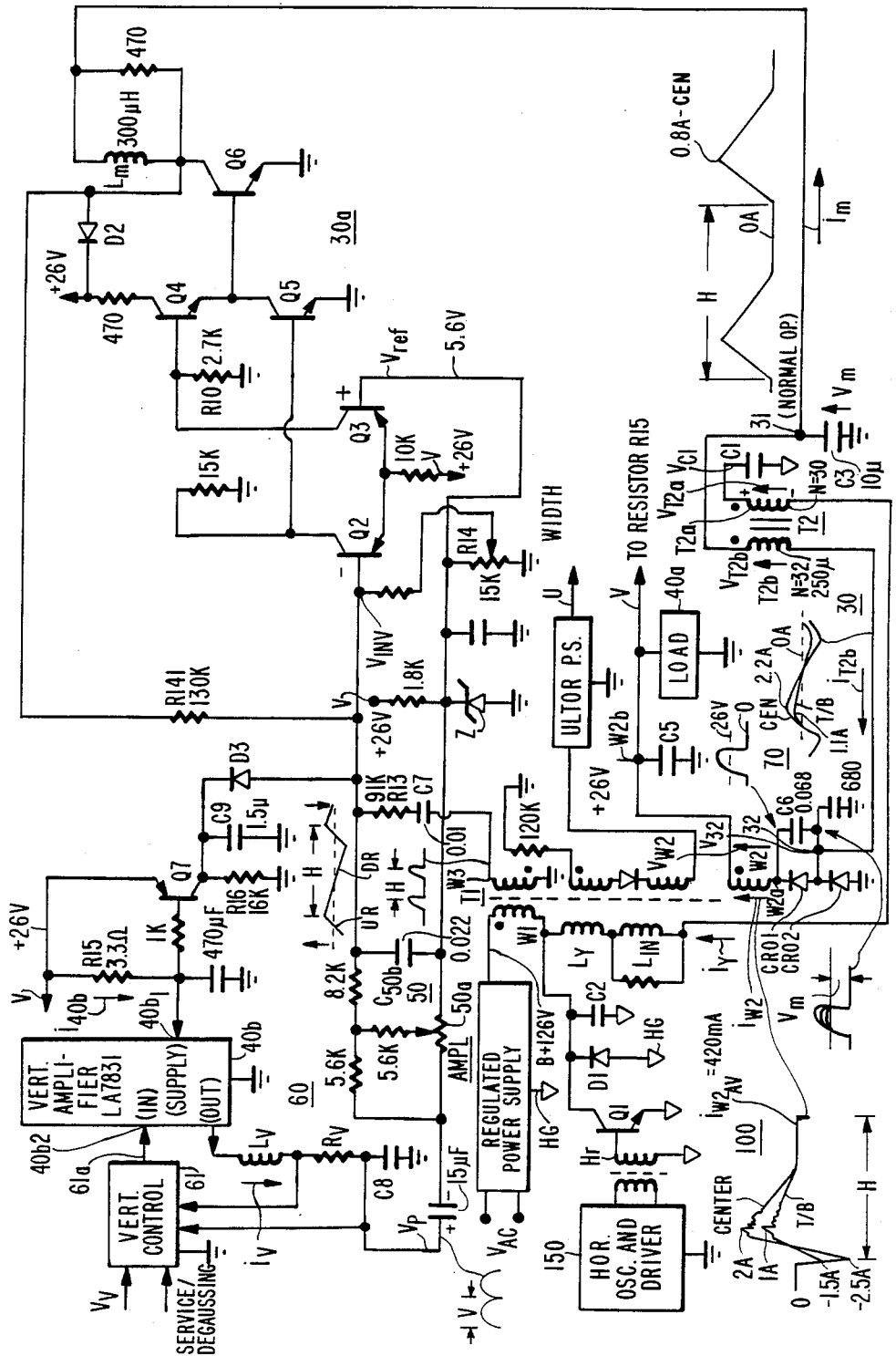

POWER SUPPLY PROTECTION CIRCUIT

The invention relates to an over-voltage protection circuit in a television apparatus power supply.

The horizontal deflection circuit in some conventional television receivers encompasses an output stage that includes a horizontal deflection winding and a trace capacitance that supplies deflection current to the deflection winding during each trace interval. A retrace capacitance is coupled across the deflection winding during the retrace interval. Energy is replenished during retrace via a flyback transformer. A deflection transistor switch that is conductive during trace, causes a DC voltage B+ to be developed across a primary winding of the flyback transformer during trace.

In a circuit embodying an aspect of the invention, a secondary winding of the flyback transformer is series coupled through a rectifier arrangement to a common conductor, referred to as ground. The rectifier arrangement includes a diode switch. The anode of the diode is at, for example, ground potential. The cathode of the diode switch is coupled to one end terminal of the secondary winding. A filter capacitor is coupled between ground and a second end terminal of the secondary winding that is remote from the cathode of the diode switch. A load circuit is coupled across the filter capacitor.

During trace, a trace voltage developed in the secondary winding produces a trace current in the secondary winding that is coupled to the filter capacitor and to the load circuit. The secondary winding current develops a rectified DC output supply voltage in the filter capacitor. The secondary winding current flows in a current path that includes the diode switch. The secondary winding current produces a forward current in the diode switch that causes the diode switch to be conductive during trace. When the diode switch is conductive, the secondary winding forms a voltage source having a relatively low output impedance. As long as the diode switch is conductive, the forward voltage developed at the cathode of the diode switch is negligible. Therefore, the output supply voltage is determined mainly by the primary-to-secondary turn ratio of the flyback transformer and by voltage B+ and is not affected by the voltage at the cathode of diode switch.

During retrace, a retrace pulse voltage is developed in the secondary winding of the transformer in the opposite polarity that causes the diode switch to be nonconductive. A retrace voltage is developed at the cathode of the diode switch. Thus, in normal operation, the diode switch is conductive throughout trace and nonconductive during retrace so as to provide the DC output supply voltage that is rectified by the diode switch.

In a well known side pincushion distortion correction circuit of the diode modulator type, the same diode switch that was discussed before also provides switching operation in the diode modulator. To that end, a circuit branch of the diode modulator has an end terminal that is coupled between the secondary winding and the cathode of the diode switch such that the cathode forms a three way junction node where three branches intersect: the circuit branch of the diode modulator, a circuit branch that includes the diode switch and a circuit branch that includes the secondary winding. A current flowing through the above mentioned circuit branch of the diode modulator, during, for example, the first half of trace, may supply a portion of the current that flows in the secondary winding and, hence reduce the forward current in the diode switch. Thus, the secondary winding current may be equal to the sum of the absolute value of the forward current and the current in the circuit branch of the diode modulator.

The current in the secondary winding is determined by the load current. Therefore, a decrease in the load current causes the forward current in the diode switch to decrease. The load circuit that is coupled across the filter capacitor associated with the diode switch may include a vertical amplifier integrated circuit of the television receiver that is energized by the output supply voltage. During degaussing, during service operation, in which the vertical raster is collapsed, and in the event of a fault condition, for example, the vertical amplifier output current, hence the load current, may be significantly smaller than during normal operation. Should the load current decrease, the secondary winding current would also decrease. Should the secondary winding current decrease to a level that is, for example, equal to that of the current in the circuit branch of the diode modulator, the current in the circuit branch of the diode modulator will cause the forward current of the diode switch to become zero. A further decrease in the secondary winding current will cause the cathode voltage of the diode switch that is then nonconductive to increase substantially above ground potential.

The trace voltage that is developed across the secondary winding is coupled in series with the voltage at the cathode of the diode switch. An increase in the cathode voltage during trace, disadvantageously, may cause the output supply voltage to exceed its normal operation level. An increase in the output supply voltage may damage other integrated circuits such as, for example, audio processing integrated circuits that are also energized by the output supply voltage.

A television apparatus power supply embodying an aspect of the invention includes a controllable switch coupled to a horizontal deflection winding for producing a horizontal deflection current in the horizontal deflection winding and an output supply voltage. A raster distortion correction circuit is coupled to the horizontal deflection winding for producing a modulation of the horizontal deflection current. The raster distortion correction circuit produces a second current. A vertical deflection circuit is coupled to the output supply voltage that produces a load current in the vertical deflection circuit for energizing the vertical deflection circuit. The load current has a magnitude that is within a predetermined range of values during normal operation and outside the range of values when the vertical deflection circuit is disabled or when a fault condition occurs. A first control signal is generated that is indicative when the magnitude of the load current is outside the range of values. The control signal is coupled to the raster distortion correction circuit for disabling the operation of the raster distortion correction circuit when the magnitude of the load current is outside the range of values.

In accordance with a feature of the invention, the control signal prevents the second current from causing an increase in the output supply voltage.

The sole FIGURE illustrates an East-West raster distortion correction circuit of a horizontal deflection circuit that includes a protection circuit, embodying an aspect of the invention.

The sole FIGURE illustrates a horizontal deflection circuit output stage 100 that operates also as a power supply for generating a supply voltage V. Voltage V of, for example, +26 volts, is developed across a filter capacitor C5. Voltage V energizes a load circuit 40a and a vertical deflection amplifier 40b. Load circuit 40a may be, for example, an audio processing stage of a television receiver, not shown.

Output stage 100 includes a deflection switching transistor Q1 that is antiparallel coupled with a damper diode D1. A retrace capacitor C2 is coupled across diode D1 and between the collector and emitter electrodes of transistor Q1. A primary winding W1 of a flyback transformer T1 is coupled between an input supply voltage B+ and the collector electrode of transistor Q1. A horizontal deflection winding $L_y$, a linearity inductor $L_{LIN}$, a primary winding T2a of a transformer T2 of an East-West pincushion distortion correction circuit 30 and a trace capacitor C1 form a series arrangement that is coupled between the collector of transistor Q1 and ground. Transistor Q1 is switched at a horizontal rate in accordance with a drive signal $H_r$ that is developed at its base electrode. Signal $H_r$ is produced in a horizontal oscillator and driver stage 150 in a well known manner. The switching operation of transistor Q1 produces a horizontal deflection current $i_y$ in a well known manner.

A secondary winding W2 of flyback transformer T1 has a first end terminal W2b that is coupled to filter capacitor C5 where voltage V is developed. A second end terminal W2a of winding W2 is coupled via a rectifier arrangement 70 to ground. Rectifier arrangement 70 includes diodes CR01 and CR02 that are coupled in series with winding W2. The anode of diode CR02 operating as a diode switch is at ground potential. The cathode of diode CR02 is coupled to the anode of diode CR01 via a terminal 32. Diode CR01 is coupled between terminal 32 and terminal W2a of winding W2.

During trace, when transistor Q1 is conductive, a trace voltage that is approximately equal to voltage B+ is developed in winding W1 of flyback transformer T1. During trace, a voltage $V_{W2}$ forming a trace portion of an AC voltage is developed by a transformer action across winding W2 in the polarity shown. As a result of rectifier arrangement 70 operation, voltage $V_{W2}$ produces a half wave rectified current $i_{W2}$ in winding W2 that is coupled to filter capacitor C5 and to circuits 40a and 40b.

In normal operation, during trace, current $i_{W2}$ flows in a current path that includes diodes CR01 and CR02, in a forward direction, that causes diodes CR01 and CR02 to be conductive. Consequently, voltage V that is developed at terminal W2b is equal to the value of voltage B+ multiplied by the turn ratio between windings W2 and W1. During retrace, when transistor Q1 is nonconductive, a relatively high retrace voltage in the opposite polarity is developed across winding W1. A retrace pulse voltage is developed in winding W2 in the opposite polarity to the polarity during trace that causes diodes CR01 and CR02 to operate as a nonconductive switch. Thus, in normal operation, diodes CR01 and CR02 are conductive throughout trace and nonconductive during retrace.

A secondary winding T2b of transformer T2 of pincushion distortion correction circuit 30 has a first end terminal 31 that is coupled to a modulation voltage developing capacitor C3. Terminal 32 that is coupled between diodes CR02 and CR01 forms a second end terminal of winding T2b.

During horizontal trace, a trace voltage developed across trace capacitor C1 produces, by a transformer action of transformer T2, a trace voltage $V_{T2b}$ across winding T2b in the polarity shown. Voltage $V_{T2b}$ is applied in series with capacitor C3 for producing a voltage $V_m$ developed in capacitor C3 in the polarity shown by the arrow and for producing an oscillatory current $i_{T2b}$.

During horizontal retrace, diodes CR01 and CR02 become nonconductive, as explained before. Consequently, a retrace voltage that is developed in winding T2b causes current $i_{T2b}$ in winding T2b to reverse its direction and to flow in the direction shown by the arrow at the end of retrace and during the first half of trace. Also, a retrace voltage is developed at terminal 32 that is coupled between diodes CR01 and CR02. During the second half of trace, trace current $i_{T2b}$ flows in the opposite direction to that of the arrow.

A control circuit 30a of pincushion distortion correction circuit 30 is coupled to terminal 31 of capacitor C3. Control circuit 30a generates, in a manner that is later described, a modulation sink current $i_m$ having a controllable average value that controls voltage $V_m$ in capacitor C3 in accordance with the average value DC component of current $i_m$. When the average value of sink current $i_m$ is, for example, zero, voltage $V_m$ is at a maximum. On the other hand, when the average value of current $i_m$ is at a maximum, voltage $V_m$ is at a minimum.

Modulation voltage $V_m$ that is controlled by control circuit 30a establishes, in turn, by the transformer action of transformer T2, the level of voltage $V_{T2a}$ across primary winding T2a of transformer T2. Thus, voltage $V_{T2a}$ is modulated in accordance with voltage $V_m$ or current $i_m$. Voltage $V_{T2a}$ is applied in a direction that causes the trace voltage across deflection winding $L_y$ to be smaller than voltage $V_{C1}$, developed across trace capacitor C1.

When the average value of current $i_m$ is at a minimum, voltage $V_m$ is at a maximum, and voltage $V_{T2a}$ is at a maximum. Voltage $V_{T2a}$ at the maximum causes the amplitude of deflection current $i_y$ to be at a minimum. On the other hand, when the average value of current $i_m$ is at a maximum, voltage $V_m$ is at a minimum and the amplitude of deflection current $i_y$ is at a maximum.

Control circuit 30a that produces sink current $i_m$ includes transistors Q2, Q3, Q4, Q5 and Q6 that form a switched amplifier. Transistors Q2 and Q3 form an input, differential stage of the switched amplifier. The base of transistor Q3 forms a noninverting input terminal of the switched amplifier. A reference level $V_{ref}$ developed at the base of transistor Q3 is produced in a zener diode Z. The base of transistor Q2 forms an inverting input terminal of the switched amplifier. The collector of transistor Q3 is coupled to a load resistor R10 and to the base of transistor Q4. The emitter of transistor Q4 is coupled to the base of switching transistor Q6 in a Darlington configuration. The emitter of transistor Q6 is coupled to ground. The collector of transistor Q6 is coupled via an inductor $L_m$ to capacitor C3. The collector of transistor Q6 forms a switching output terminal of the switched amplifier for producing sink current $i_m$ in inductor $L_m$ that provides East-West pincushion distortion correction.

A horizontal retrace pulse signal is coupled from a winding W3 of flyback transformer T1 via a series arrangement of a capacitor C7 and a resistor R13 to the base of transistor Q2. During horizontal retrace, the retrace pulse signal in winding W3 produces an upramping portion UR of a sawtooth signal $V_{INV}$ developed at the base of transistor Q2. During horizontal trace, a downramping portion DR of signal $V_{INV}$ changes at a smaller rate than upramping portion UR. During an interval having a controllable length that includes a portion of upramping portion UR and an immediately following portion of down ramping portion DR, signal $V_{INV}$ is more positive than voltage $V_{ref}$ developed at the base of transistor Q3. Assuming a zero offset voltage, as long as the base voltage of transistor Q2 is more positive than that of transistor Q3, transistor Q6 operates as a switch that is turned on. Conductive transistor Q6 couples inductor $L_m$ across capacitor C3 to produce an upramping portion of sink current $i_m$ in inductor $L_m$. After transistor Q6 is turned off that occurs during trace, sink current $i_m$ continues flowing, as a result of the magnetic energy stored in inductor $L_m$, in a current path that includes a diode D2. Diode D2 is coupled between the collector of transistor Q6 and voltage V. The length of the interval when transistor Q6 is conductive is modulated by, for example, a parabola voltage $V_p$ that varies in a vertical rate parabolic manner.

Voltage $V_p$ is coupled to the base of transistor Q2 via an R-C network 50. Network 50 includes a potentiometer 50a that is adjusted for controlling the amplitude of the vertical parabola voltage developed at the base of transistor Q2. Network 50 includes also an integrating capacitor 50b that determines the slope of the corresponding portions of sawtooth signal $V_{INV}$. Voltage $V_P$ causes the average DC value of signal $V_{INV}$ at the base of transistor Q2 to vary in a vertical rate parabolic manner. The result is that the length of the interval when transistor Q6 is conductive, hence each of voltage $V_m$ and the average value of current $i_m$, varies in a vertical rate parabolic manner.

A resistor R141 is coupled between the collector of transistor Q6 and the base of transistor Q2. Resistor R141 produces a negative feedback current having, during a given horizontal period H, a DC or average value that is proportional to voltage $V_m$. The current in resistor R141 is coupled to integrating capacitor 50b. As a result of the negative feedback, voltage $V_m$ that is controlled in a closed loop varies in a parabolic manner.

Voltage $V_p$ is produced in a vertical deflection circuit 60 that includes vertical amplifier 40b of the type LA7831, for example. A series arrangement that includes a vertical deflection winding $L_v$, a sampling resistor $R_v$ and a DC blocking capacitor C8 is coupled between an output terminal of amplifier 40a and ground. Parabola voltage $V_p$ is developed across capacitor C8 in a well known manner.

Circuit 60 includes a vertical control circuit 61 that produces an input signal 61a having a sawtooth waveform that is coupled to an input terminal 40b2 of amplifier 40b. Vertical control circuit 61 is responsive to a control signal SERVICE/DEGAUSSING that is used for disabling the generation of a vertical deflection current $i_V$ in winding $L_V$ during, for example, service operation and degaussing. An example of a vertical deflection circuit that includes an amplifier of the type LA7831 and a service mode operation feature is described in U.S. Pat. No. 4,694,226 in the name of James A. Wilber, entitled Vertical Deflection Circuit With Service Mode Operation and incorporated by reference herein.

As a result of parabola voltage $V_p$, the instant within horizontal retrace when transistor Q6 becomes conductive occurs earlier at the center of vertical trace than at the top and bottom. Hence, each of the average value of current $i_m$ that sinks charge from capacitor C3 in each horizontal period H and the level of voltage $V_m$ is at a maximum at the center of vertical trace and at a minimum at the top and bottom of vertical trace. Consequently, the amplitude of deflection current $i_y$ is at a maximum at the center of vertical trace and at a minimum at the top and bottom in a manner that provides East-West pincushion distortion correction. A potentiometer R14 that is coupled to the base of transistor Q2 provides width adjustment.

When, during horizontal trace, transistor Q2 becomes nonconductive, the collector voltage of transistor Q2 increases. Consequently, transistor Q5 having a base electrode that is coupled to the collector of transistor Q2 becomes conductive. When transistor Q5 becomes conductive, it forms a low impedance between the base and emitter of transistor Q6 that, advantageously, speeds up the turn-off of transistor Q6.

Transformers T1 and T2 electrically isolate, with respect to electrical shock hazard, voltage V and control circuit 30a from voltage B+ and from AC mains supply voltage $V_{AC}$. Voltage B+ is electrically nonisolated with respect to electrical hazard from AC mains supply voltage $V_{AC}$ that is used for producing voltage B+. Thus transformers T1 and T2 provide an isolation barrier. Supply voltage V is coupled via a resistor R15 to a supply terminal 40b1 of vertical amplifier 40b.

During, for example, degaussing, it may be desirable to disable the vertical deflection current in order to prevent introducing purity error in a cathode ray tube of the receiver, not shown. Thus, during degaussing and also during service operation, signal SERVICE/DEGAUSSING is generated in a well known manner, not shown, for disabling the generation of the vertical deflection current $i_y$. When signal SERVICE/DEGAUSSING is generated or during the occurrence of a fault condition, a supply current $i_{40b}$ flowing in vertical deflection amplifier 40b and through resistor R15 may be at a substantially smaller magnitude than during normal operation. The result is that trace current $i_{W2}$ in winding W2 will also decrease.

Assume that throughout the first half of normal horizontal trace operation, current $i_{W2}$ is larger than current $i_{T2b}$. Therefore, diode CR02 that conducts the difference between currents $i_{W2}$ and $i_{T2b}$ remains conductive throughout horizontal trace. It follows that, during normal operation, diode CR02 prevents trace current $i_{T2b}$ from affecting voltage V.

Should current $i_{W2}$ decrease significantly relative to its normal operation level, as a result of the aforementioned decrease in load current $i_{40b}$, positive trace current $i_{T2b}$ in winding T2b of transformer T2 might become equal to current $i_{W2}$, during a significant portion of the first half of the horizontal trace. Therefore, diode CR02 might become nonconductive during such significant portion of the first half of horizontal trace. The result is that current $i_{T2b}$ might produce a wide pulse of voltage $V_{32}$ at the cathode of reverse-biased diode CR02 having a relatively large positive peak level. The sum of voltages $V_{W2}$ and $V_{32}$ forms voltage V. Therefore, should the peak level of the pulse of voltage $V_{32}$ become large and its width significant, during the aforementioned vertical raster collapse, voltage $V_{32}$ would cause voltage V to be larger than during normal operation. Voltage V might harm some integrated circuits depicted as load 40a that are energized by supply voltage V.

In carrying out an aspect of the invention, a transistor Q7 has an emitter electrode and a base electrode that are coupled to end terminals of resistor R15, respectively, for sensing load current $i_{40b}$ in vertical amplifier 40b. The collector of transistor Q7 is coupled via a parallel arrangement of a filter capacitor C9 and a bleeder resistor R16 to ground. A switch diode D3 is coupled between the base of transistor Q2 and a junction terminal that is coupled between the collector of transistor Q7 and the parallel arrangement of filter capacitor C9 and resistor R16.

During normal operation, supply or load current $i_{40b}$ in vertical amplifier 40b that flows also in resistor R15 produces a voltage drop across resistor R15 that is sufficiently large to cause transistor Q7 to be conductive during at least a portion of each vertical deflection cycle. Consequently, a DC positive filtered voltage that is developed across capacitor C9 is maintained sufficiently high to maintain diode D3 back-biased throughout each vertical deflection cycle.

Should the maximum value of load current $i_{40b}$ in a given vertical deflection cycle become smaller than a predetermined level, as a result of, for example, vertical deflection circuit 60 being disabled, transistor Q7 would remain turned-off. Therefore diode D3 would become conductive throughout each vertical deflection cycle. Consequently, the base voltage of transistor Q2 would become smaller than that of transistor Q3. The result is that transistor Q6 would be maintained nonconductive indefinitely, causing the average value current $i_m$ to be zero.

When the average value of current $i_m$ is at a maximum, voltage $V_m$ is at a minimum and the positive peak amplitude of current $i_{T2b}$ in winding T2b, at the beginning of trace, is at a maximum. Conversely, when the average value of current $i_m$ is at a minimum, the peak positive amplitude of current $i_{T2b}$ is at a minimum.

When, for example, the vertical raster is collapsed, current $i_m$ is zero because of the operation of diode D3 that was explained above. The result is that current $i_{T2b}$ is at a minimum positive peak amplitude that is smaller than current $i_{W2}$ flowing in winding W2. Since the difference between current $i_{W2}$ and current $i_{T2b}$ flows as the forward current of diode CR02, diode CR02 remains conductive throughout the first half of horizontal trace. It follows that voltage $V_{32}$ is maintained at the forward voltage level of diode CR02 throughout horizontal trace. When diode CR02 is conductive, diode CR02, advantageously, prevents current $i_{T2b}$ from affecting current $i_{W2}$. Thus, diode CR02 decouples a current path that includes winding T2b from a current path that includes winding W2. In this way, advantageously, voltage V is prevented from exceeding its normal operation level when, for example, the vertical raster is collapsed.

When vertical amplifier 40b is disabled during, for example, service operation, voltage V will continue to be generated for enabling horizontal scanning operation. Such normal horizontal scanning operation may be required during service operation. Thus, voltage V is protected by the operation of transistor Q7 in a way that, advantageously, does not necessitate a complete shutdown of horizontal deflection circuit 100.

What is claimed is:
1. A power supply apparatus for a television apparatus, comprising:
   a vertical deflection circuit;
   means for generating a control signal indicative of normal operation of said vertical deflection circuit being disabled;
   a horizontal deflection circuit for producing a horizontal deflection current in a horizontal deflection winding;
   a side pincushion distortion correction circuit coupled to said horizontal deflection circuit for producing a modulation of said horizontal deflection current; and
   means responsive to said control signal and coupled to said pincushion distortion correction circuit for disabling said pincushion distortion correction circuit when said normal operation of said vertical deflection circuit is disabled.
2. A power supply according to claim 1 wherein said control signal generating means is responsive to an input supply current that flows in said vertical deflection circuit for producing a first level of said control signal when said input current of said vertical deflection circuit is within a corresponding normal operation range and a second level of said first control signal when said input current is substantially smaller than during normal operation.
3. A power supply according to claim 1 wherein said horizontal deflection circuit comprises a horizontal flyback transformer having first and second windings and a horizontal deflection switch operating at a frequency that is related to a horizontal deflection frequency and coupled to said first winding of said transformer for generating an AC supply voltage in said second winding at a frequency that is related to said horizontal deflection frequency, wherein a diode switch is coupled to said second winding for rectifying said AC supply voltage to produce an output supply current that is coupled to said vertical deflection circuit for energizing said vertical deflection circuit, said supply current being coupled via said second winding to said diode switch to produce a forward current in said diode switch that causes said diode switch to be conductive during a horizontal trace interval and nonconductive during a horizontal retrace interval such that when said vertical deflection circuit is disabled a magnitude of said supply current becomes substantially smaller than during normal operation, wherein said pincushion distortion correction circuit comprises a second transformer having a first winding that is coupled to said deflection winding and having a second winding that is coupled to said diode switch such that the switching operation of said diode switch also produces an oscillatory second current in said second winding of said second transformer, said second current being combined in said diode switch with a current that flows in said second winding of said flyback transformer in a manner that reduces said forward current in said diode switch during said trace interval and wherein said pincushion distortion correction circuit disabling means decreases a magnitude of said second current in said second winding of said second transformer when a magnitude of said output supply current is substantially smaller than during normal operation to prevent said second current from back-biasing said diode switch at least substantially throughout said horizontal trace interval.
4. A television apparatus power supply, comprising:

a horizontal flyback transformer having first and second windings;

a horizontal deflection winding;

a horizontal deflection switch coupled to said first winding of said transformer for generating an AC supply voltage said deflection winding for producing a horizontal deflection current therein;

a load circuit;

a diode switch coupled to said second winding for rectifying said AC supply voltage to produce an output load current for energizing said load circuit, said load current being coupled via said second winding to said diode switch to produce a forward current in said diode switch that causes said diode switch to be conductive during a horizontal trace interval and nonconductive during a horizontal retrace interval;

means for generating a control signal that is indicative of said load current being substantially different than during normal operation;

an inductance that is coupled to said diode switch such that the switching operation of said diode switch produces an oscillatory second current in said inductance, said second current being combined in said diode switch with a current that flows in said second winding of said flyback transformer in a manner that reduces said forward current in said diode switch during said trace interval; and means responsive to said control signal for changing said second current in said inductance when said load current is substantially different than during normal operation to prevent said second current from back-biasing said diode switch during said horizontal trace interval.

5. A television apparatus power supply, comprising:

a horizontal flyback transformer having first and second windings;

a horizontal deflection winding;

a horizontal deflection switch coupled to said first winding of said transformer for generating an AC supply voltage in said second winding, said deflection switch being coupled to said deflection winding for producing a horizontal deflection current therein;

a vertical deflection circuit;

a diode switch coupled to said second winding for rectifying said AC supply voltage to produce an output supply current for energizing said vertical deflection circuit, said supply current being coupled via said second winding to said diode switch to produce a forward current in said diode switch that causes said diode switch to be conductive during a horizontal trace interval and nonconductive during a horizontal retrace interval such that when said vertical deflection circuit is disabled a magnitude of said supply current becomes substantially smaller than during normal operation;

means responsive to said supply current for generating a first control signal that is indicative of said load current;

a second transformer having a first winding that is coupled to said deflection winding and having a second winding that is coupled to said diode switch such that the switching operation of said diode switch produces an oscillatory second current in said second winding of said second transformer, said second current being combined in said diode switch with a current that flows in said second winding of said flyback transformer in a manner that reduces said forward current in said diode switch during said trace interval; and controllable means responsive to said first control signal and coupled to said second winding of said second transformer for decreasing said second current when said supply current is substantially smaller than during normal operation to prevent said second current from back-biasing said diode switch during said horizontal trace interval.

6. A power supply according to claim 5 wherein said second transformer and said controllable means form a diode modulator, said diode modulator further including a capacitance for developing a modulation voltage that is coupled to said second winding of said second transformer, said controllable means being responsive to a vertical rate parabolic signal for producing a modulation sink current that is coupled to said capacitance for controlling said modulation voltage in a manner that provides East-West pincushion distortion correction such that when said supply current is substantially smaller than during normal operation said magnitude of said second current is substantially reduced in accordance with said first control signal.

7. A television apparatus power supply, comprising:

a horizontal deflection winding;

a controllable switch coupled to said horizontal deflection winding for producing a horizontal deflection current in said deflection winding;

means coupled to said controllable switch for producing an output supply voltage;

a raster distortion correction circuit coupled to said horizontal deflection winding for producing a modulation of said horizontal deflection current, said raster distortion correction circuit producing a second current that is coupled to said output supply voltage producing means;

a vertical deflection circuit coupled to said output supply voltage that produces a load current in said vertical deflection circuit for energizing said vertical deflection circuit, said load current having a magnitude that is within a predetermined range of values during normal operation and outside said range of values when said vertical deflection circuit is disabled or when a fault condition occurs; and means responsive to said load current for producing a first control signal that is indicative of said magnitude of said load current being outside said range of values, said first control signal being coupled to said raster distortion correction circuit for disabling the operation of said raster distortion correction circuit when said magnitude of said load current is outside said range of values.

8. A power supply according to claim 7 wherein said raster distortion correction circuit comprises a diode modulator.

9. A power supply according to claim 8 wherein said output supply voltage generating means comprises a first winding of a horizontal flyback transformer that is coupled to said controllable switch for producing in said first winding an AC supply voltage having in a given period thereof a trace portion and a retrace portion and a diode switch coupled to said first winding for rectifying said AC supply voltage to produce, in accordance with a switching operation of said diode switch, said output supply voltage said diode switch being coupled to a circuit branch of a source of modulation signal for generating in accordance with the switching operation of said diode switch an oscillatory second current in said circuit branch.

10. A power supply according to claim 8 wherein said diode modulator provides an East-West pincushion distortion correction and generates during normal operation said oscillatory second current that is combined in said diode switch with a current that flows in said first winding to produce, in accordance with a difference therebetween, a forward current in said diode switch such that when said magnitude of said load current becomes substantially smaller that during normal operation, said first control signal causes a magnitude of said second current to decrease for preventing said diode switch from being back biased during trace.

11. A power supply according to claim 10 wherein said diode modulator comprises a capacitance, a first winding of a second transformer that is coupled between said diode switch and said capacitance and means responsive to said first control signal and to a parabola signal for modulating a voltage that is developed in said capacitance such that when said load current is outside said range of values said capacitance voltage modulating means causes a substantial reduction in said magnitude of said second current that flows in said first winding of said second transformer, and wherein said second transformer has a second winding that is coupled in series with said horizontal deflection winding for applying said capacitance voltage to said horizontal deflection winding for modulating said horizontal deflection current.

12. A power supply according to claim 11 wherein said first and second transformers form an isolation barrier.

13. A power supply according to claim 7 wherein a second control signal that is indicative of a service mode operation is coupled to said vertical deflection circuit for disabling the operation of said vertical deflection circuit during said service mode of operation thereby causing said load current to be outside said range of values.

14. A power supply according to claim 7 wherein said first control signal prevents said second current from causing an increase in said output supply voltage.

15. A power supply apparatus for a television apparatus, comprising:
means for generating an AC supply voltage in a first circuit branch at a frequency that is related to a deflection frequency;
switching means coupled to said first circuit branch for generating an output supply voltage at a supply terminal of said first circuit branch and an output supply current in said first circuit branch that are developed from the rectification of said AC supply voltage by the switching operation of said switching means;
means coupled to said switching means to form a second circuit branch for generating in accordance with the switching operation of said switching means a second current in said second circuit branch that varies at a rate related to said deflection frequency such that a main current conducting path in said switching means is common to both said first and second circuit branches;
means responsive to said output supply current for generating a first control signal that is indicative of a magnitude of said output supply current being outside a normal operation range; and
means responsive to said first control signal and coupled to said second current generating means for controlling said second current when said magnitude of said output supply current is outside said normal operation range to prevent said second current from affecting said output supply voltage, said first control signal responsive means not affecting said second current when said magnitude of said output supply current is within said normal operation range.

16. A power supply according to claim 15 wherein, in a given period of said AC supply voltage, when said switching means is at a first switching state said switching means decouples said second circuit branch from said first circuit branch.

17. A power supply according to claim 16 wherein said second current controlling means causes said second current to be at a different level when said magnitude of said output supply current is outside said normal operation range than during normal operation for preventing said second current from affecting said first switching state of said switching means, thereby preventing said second current from affecting said output supply voltage.

18. A power supply according to claim 15 wherein said AC supply voltage generating means comprises a horizontal deflection circuit that generates a horizontal deflection current in a horizontal deflection winding and that generates said AC supply voltage in a first winding of a flyback transformer.

19. A power supply according to claim 18 wherein said switching means comprises a diode switch that is coupled in series with said first winding of said flyback transformer.

20. A power supply according to claim 19 wherein said diode switch is conductive substantially throughout a trace interval of said given period and nonconductive during a retrace interval thereof.

21. A power supply according to claim 18 wherein said second current generating means and said switching means form a diode modulator that is coupled to said deflection winding for modulating said deflection current to provide East-West pincushion distortion correction.

22. A power supply according to claim 15 wherein said first control signal generating means causes a magnitude of said second current to be substantially smaller than during normal operation.

23. A power supply according to claim 15 wherein said switching means comprises a diode switch that is coupled in series with a first winding of a flyback transformer of a horizontal deflection circuit for producing said output supply voltage that is rectified at a terminal of said first winding, wherein said terminal of said first winding is remote from a first junction terminal, disposed between said diode switch and said first winding, and wherein said second circuit branch is coupled to a second junction terminal that is disposed between said first winding and said diode switch.

24. A power supply according to claim 15 wherein said output supply voltage and output supply current are coupled to a vertical deflection circuit and wherein said magnitude of said output supply current is outside said normal operation range when a vertical deflection raster is collapsed.

25. A power supply according to claim 24 wherein said first control signal generating means is responsive to an input supply current that flows in said vertical deflection circuit for producing a first level of said first control when said input current of said vertical deflection circuit is within a corresponding normal operation range and a second level of said first control signal when said input current is substantially smaller than during normal operation.

26. A power supply according to claim 15 wherein said second current generating means and said switching means form a raster distortion correction circuit that is disabled when said magnitude of said output supply current is outside said normal operation range.

27. A power supply according to claim 26 wherein said output supply current and output supply voltage are coupled to a supply terminal of a vertical deflection amplifier, said vertical deflection being responsive to a second control signal for disabling the operation of said vertical deflection amplifier during degaussing operation or during service operation such that when said vertical deflection amplifier is disabled said magnitude of said output supply current is outside said normal operation range.

28. A power supply according to claim 15 wherein said switching means decouples said first circuit branch from said second circuit branch when said switching means is conductive.

* * * * *